United States Patent
Choi et al.

(10) Patent No.: US 11,882,280 B2
(45) Date of Patent: *Jan. 23, 2024

(54) METHOD FOR DECODING IMAGE BY USING BLOCK PARTITIONING IN IMAGE CODING SYSTEM, AND DEVICE THEREFOR

(71) Applicant: LG ELECTRONICS INC., Seoul (KR)

(72) Inventors: Jangwon Choi, Seoul (KR); Seunghwan Kim, Seoul (KR); Jin Heo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/740,037

(22) Filed: May 9, 2022

(65) Prior Publication Data

US 2022/0329796 A1    Oct. 13, 2022

Related U.S. Application Data

(63) Continuation of application No. 17/277,639, filed as application No. PCT/KR2019/012196 on Sep. 20, 2019, now Pat. No. 11,368,687.

(Continued)

(51) Int. Cl.
*H04N 19/119* (2014.01)
*H04N 19/136* (2014.01)
(Continued)

(52) U.S. Cl.
CPC ......... *H04N 19/119* (2014.11); *H04N 19/136* (2014.11); *H04N 19/176* (2014.11); *H04N 19/186* (2014.11); *H04N 19/70* (2014.11)

(58) Field of Classification Search
CPC .......................... H04N 19/119; H04N 19/136
See application file for complete search history.

(56) References Cited

U.S. PATENT DOCUMENTS

| 2014/0254677 A1 | 9/2014 | Oh et al. |
| 2015/0341637 A1* | 11/2015 | Kim ............... H04N 19/119 |
| | | 375/240.12 |

(Continued)

FOREIGN PATENT DOCUMENTS

| CN | 10568444 A | 6/2016 |
| CN | 108293109 A | 7/2018 |

(Continued)

OTHER PUBLICATIONS

Chia-Ming TSAI, et al., "CE1.3.5: Maximum TT split depth restriction", Joint Video Experts Team (JVET) of ITU-T SG 16 WP 3 and ISO/IEC JTC 1/SC 29/WG 11, 11th Meeting: Ljubljana, SI, Jul. 10-20, 2018. JVET-K0225-v1.

*Primary Examiner* — Jerry T Jean Baptiste
(74) *Attorney, Agent, or Firm* — Bryan Cave Leighton Paisner LLP

(57) ABSTRACT

The method for decoding an image by a decoding device according to the present document may comprise the steps of: acquiring image information comprising partitioning information for a current block; determining, on the basis of the size of the current block, whether to partition the current block; partitioning the current block into subblocks on the basis of the partitioning information, if it is determined that the current block is to be partitioned, and decoding the subblocks; and not partitioning the current block, if it is determined that the current block is not to be partitioned, and decoding the current block, wherein, if the current block is a chroma block, and the size of the current block is at most (Continued)

the minimum size of a chroma block, then it is determined that the current block is not to be partitioned.

13 Claims, 17 Drawing Sheets

Related U.S. Application Data

(60) Provisional application No. 62/734,292, filed on Sep. 21, 2018.

(51) Int. Cl.
*H04N 19/176* (2014.01)
*H04N 19/186* (2014.01)
*H04N 19/70* (2014.01)

(56) References Cited

U.S. PATENT DOCUMENTS

2017/0347128 A1  11/2017  Panusopone et al.
2021/0274175 A1*  9/2021  Lim .................... H04N 19/167

FOREIGN PATENT DOCUMENTS

| | | |
|---|---|---|
| JP | 2016106482 A | 6/2016 |
| KR | 20180000336 A | 1/2018 |
| WO | 16/074147 A1 | 11/2014 |
| WO | 2016074147 A1 | 5/2016 |
| WO | 18/045944 A1 | 3/2018 |
| WO | 18/070554 A1 | 4/2018 |
| WO | 2018169267 A1 | 9/2018 |

* cited by examiner

SPLIT_BT_VER

SPLIT_BT_HOR

SPLIT_TT_VER

SPLIT_TT_HOR

METHOD FOR DECODING IMAGE BY USING BLOCK PARTITIONING IN IMAGE CODING SYSTEM, AND DEVICE THEREFOR

CROSS-REFERENCE TO RELATED APPLICATIONS

This application is a Continuation Application of U.S. patent application Ser. No. 17/277,639, filed on Mar. 18, 2021, which is a 371 of International Application No. PCT/KR2019/012196, filed on Sep. 20, 2019, which claims the benefit of U.S. Provisional Application No. 62/734,292 filed on Sep. 21, 2018, the contents of which are all hereby incorporated by reference herein in their entirety.

BACKGROUND OF THE DISCLOSURE

Field of the Disclosure

The present disclosure relates to a video coding technology, and more particularly, to a video decoding method using block partitioning in a video coding system and an apparatus thereof.

Related Art

Recently, demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present disclosure provides a method and device for improving image coding efficiency.

The present disclosure also provides a method and device for improving intra-prediction efficiency.

The present disclosure also provides a method and device for improving intra-prediction efficiency based on cross component linear model (CCLM).

The present disclosure also provides an efficient encoding and decoding method for CCLM prediction, and a device for performing the encoding and decoding method.

The present disclosure also provides a method and device for selecting a neighbor sample to derive a linear model parameter for CCLM.

In an aspect, a video decoding method performed by a decoding apparatus is provided. The method includes: obtaining image information including partitioning information; determining whether a current block is partitioned based on a size of the current block; and decoding the current block or decoding sub-blocks of the current block based on whether the determined current block is partitioned, wherein when it is determined that the current block is partitioned, the current block is partitioned into the sub-blocks based on the partitioning information, and the sub-blocks are decoded, wherein when it is determined that the current block is not partitioned, the current block is not partitioned, and the current block is decoded, and wherein when the current block is a chroma block and the size of the current block is less than or equal to a minimum chroma block size, it is determined that the current block is not partitioned.

In another aspect, a decoding apparatus for performing video decoding is provided. The device apparatus includes: an entropy decoder obtaining image information including partitioning information; and a predictor determining whether a current block is partitioned based on a size of the current block and decoding the current block or decoding sub-blocks of the current block based on whether the determined current block is partitioned, wherein when it is determined that the current block is partitioned, the current block is partitioned into the sub-blocks based on the partitioning information, and the sub-blocks are decoded, wherein when it is determined that the current block is not partitioned, the current block is not partitioned, and the current block is decoded, and wherein when the current block is a chroma block and the size of the current block is less than or equal to a minimum chroma block size, it is determined that the current block is not partitioned.

In another aspect, a video encoding method performed by an encoding apparatus is provided. The method includes: determining a partition type for a current block; determining whether to partition the current block based on a size of the current block; not partitioning the current block if the current block is determined not to be partitioned and partitioning the current block into sub-blocks based on the partition type if the current block is determined to be partitioned; and encoding image information including partitioning information indicating the partition type for the current block, wherein when the current block is a chroma block and the size of the current block is less than or equal to a minimum chroma block size, it is determined that the current block is not partitioned.

In another aspect, a video encoding apparatus is provided. The encoding apparatus includes: an image partitioner determining a partition type for a current block, determining whether to partition the current block based on a size of the current block, not partitioning the current block if the current block is determined not to be partitioned and partitioning the current block into sub-blocks based on the partition type if the current block is determined to be partitioned; and an entropy encoder encoding image information including partitioning information indicating the partition type for the current block, wherein when the current block is a chroma block and the size of the current block is less than or equal to a minimum chroma block size, it is determined that the current block is not partitioned.

Advantageous Effects

According to the present disclosure, overall image/video compression efficiency may be improved.

According to the present disclosure, image coding efficiency may be improved by effectively performing image partitioning.

According to the present disclosure, it is possible to reduce a worst case data throughput by limiting partitioning into luma blocks and/or chroma blocks having a specific size or less, thereby effectively reducing an encoding and decoding processing rate.

DESCRIPTION OF EXEMPLARY EMBODIMENTS

Figure 1:
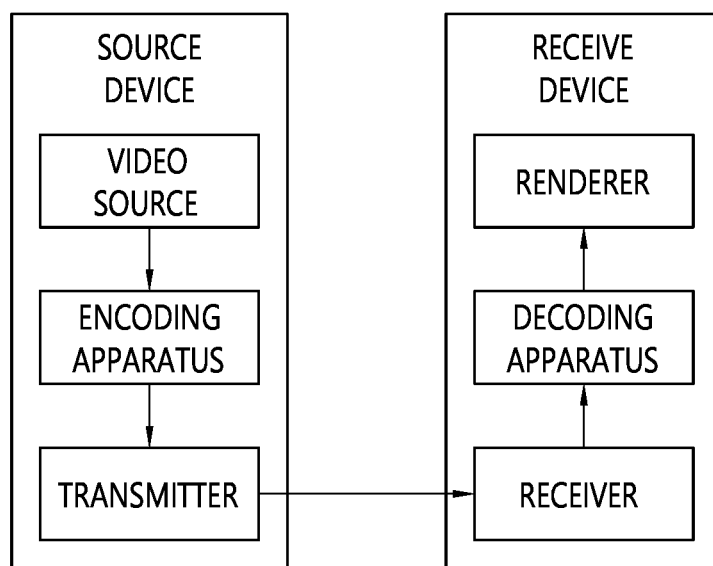
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

Figure 2:
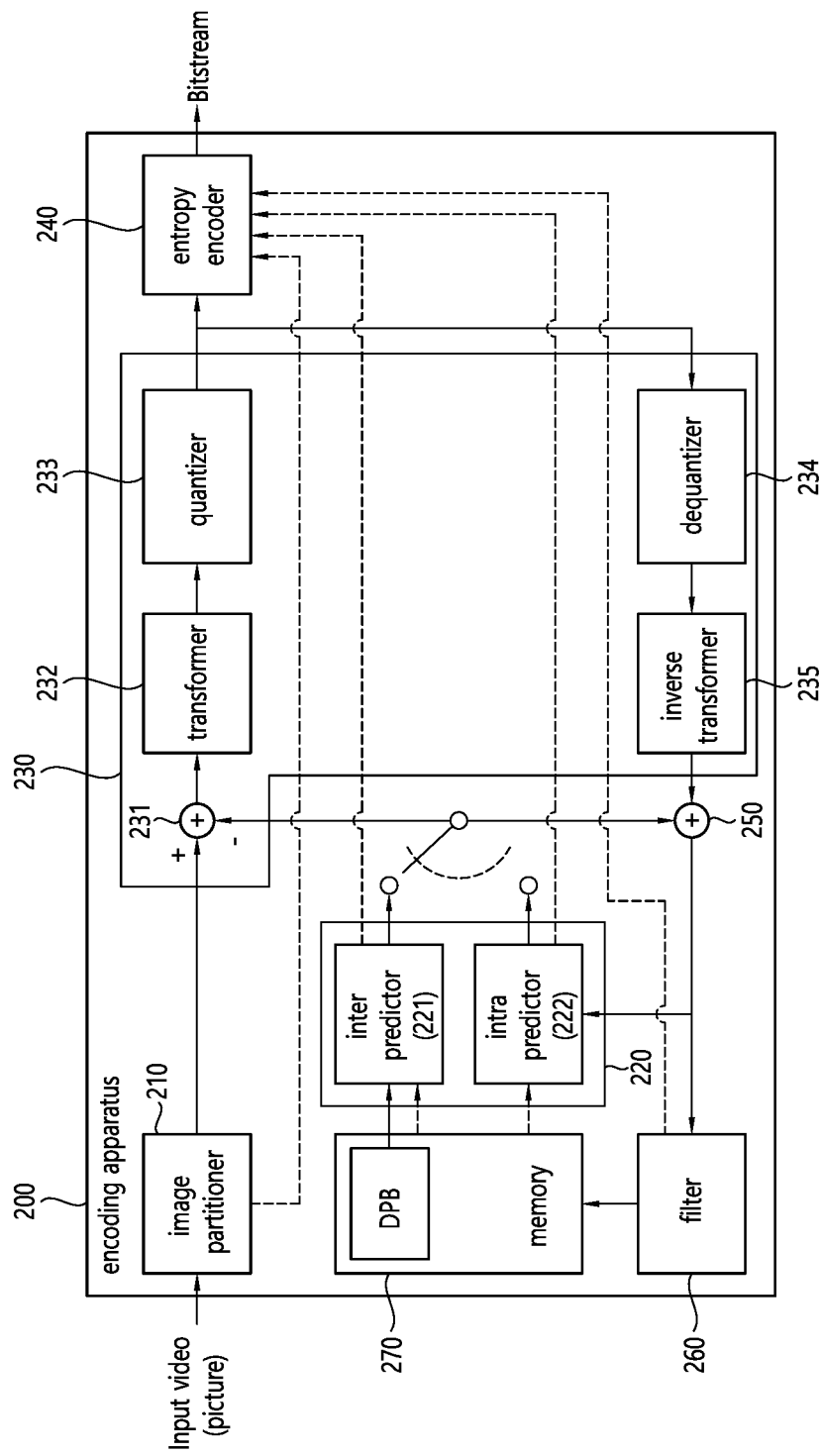
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
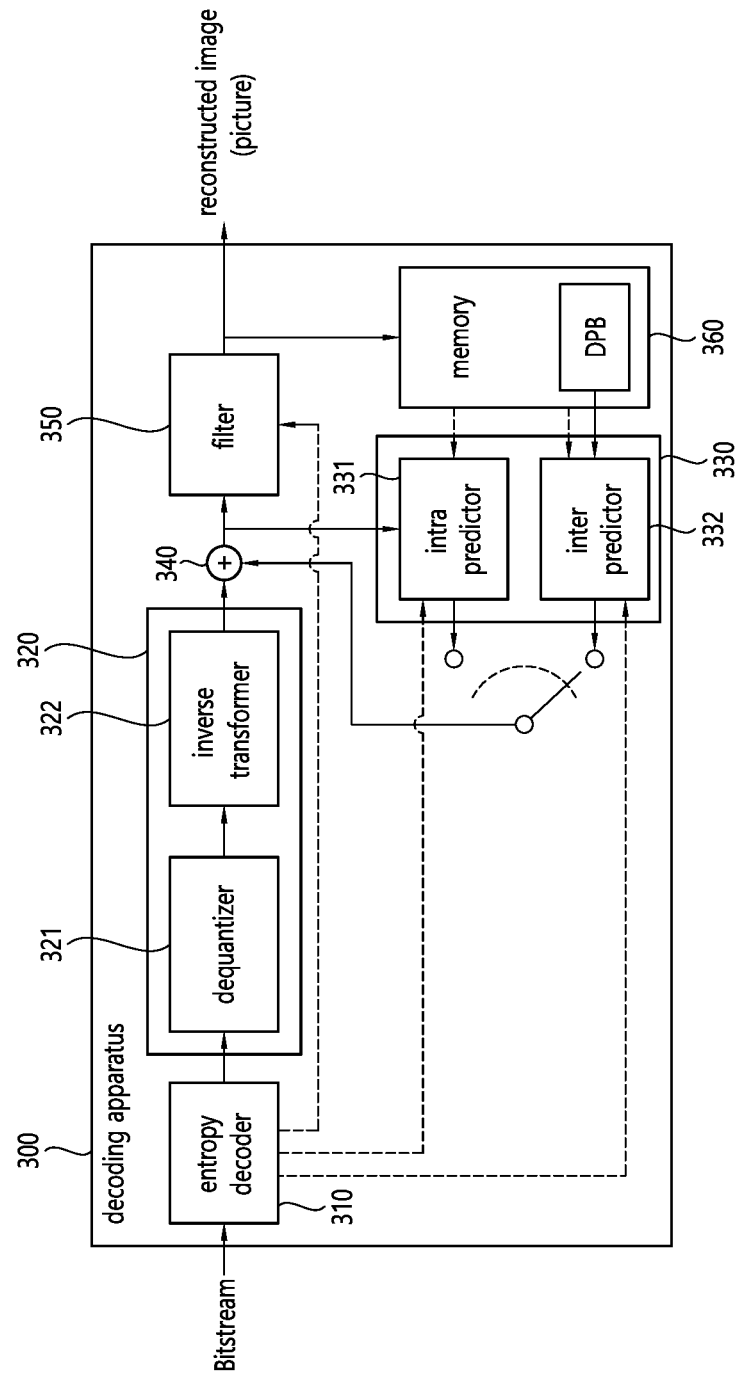
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. That is, the image partitioner of the decoding apparatus 300 may partition an input image (or picture, frame) into one or more processing units. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Meanwhile, encoding target images of the VVC standard are high-resolution images such as UHD and FHD, and hardware is increasingly complicated to process the images. For example, when the intra prediction described above is performed in the VVC standard software VTM2.0.1, a 128×128-sized coding tree unit (CTU) is used, but a minimum CU block size is 4×4 size for luma blocks and 2×2 size for chroma blocks. Therefore, when an UHD image (3840× 2160 resolution) is encoded by performing intra prediction through the VTM2.0.1 software, in a worst case scenario, the UHD image may be partitioned into 518,400 4×4 luma blocks and 1,036,800 2×2 chroma blocks. Here, the worst case may represent a case in which all of the luma components of the UHD image are encoded into 4×4-sized luma blocks, and all of the chroma components are encoded into 2×2-sized chroma blocks. In hardware implementation, data throughput should cover the worst case, which may lead to an increase in hardware manufacturing cost and hardware delay.

The present disclosure proposes embodiments for solving the above-described problem.

In an embodiment, a method of solving complexity of hardware implementation is proposed by adaptively adjusting the minimum block size according to a size of an image size (i.e., resolution). That is, in the present disclosure, an embodiment in which data throughput in the worst case is adjusted by adaptively adjusting the minimum block size according to a size of an image to control the amount of data throughput in the worst case is proposed. Here, the block may represent a coding unit (CU), a prediction unit (PU), or a transform unit (TU).

Meanwhile, experimental results for an image in which a 4×4-sized luma block and a 2×2-sized chroma block are limited on the VTM2.0.1 software may be derived as shown in the following table. That is, the experiment may represent coding of an image in which the minimum size of the luma block is 4×8 size/8×4 size and the minimum size of the chroma block is 2×4 size/4×2 size. In addition, the following table may show experimental results for images of all resolutions.

TABLE 1

| | Y | U | V | EncT | DecT |
|---|---|---|---|---|---|
| Over VTM-2.0.1 | | | | | |
| All Intra Main10 | | | | | |
| Class A1 | 0.10% | 0.01% | −0.07% | 92% | 97% |
| Class A2 | 0.12% | 0.04% | −0.01% | 90% | 97% |
| Class B | 0.30% | 0.15% | 0.17% | 88% | 93% |
| Class C | 1.08% | 0.71% | 0.90% | 85% | 91% |
| Class E | 0.63% | 0.12% | 0.25% | 91% | 99% |
| Overall | 0.46% | 0.23% | 0.28% | 88% | 95% |
| Class D | 1.42% | 1.27% | 1.03% | 83% | 90% |
| Class F (optional) | #VALUE! | #VALUE! | #VALUE! | #DIV/0! | #DIV/0! |
| Random Access Main 10 | | | | | |
| Class A1 | 0.06% | 0.03% | 0.17% | 98% | 99% |
| Class A2 | 0.15% | 0.02% | 0.04% | 94% | 97% |
| Class B | 0.25% | 0.34% | 0.44% | 95% | 97% |
| Class C | 0.89% | 1.20% | 1.37% | 94% | 92% |
| Class E | | | | | |
| Overall | 0.36% | 0.45% | 0.55% | 95% | 96% |
| Class D | 1.42% | 1.58% | 2.16% | 91% | 88% |
| Class F (optional) | #VALUE! | #VALUE! | #VALUE! | #DIV/0! | #DIV/0! |
| Low delay B Main10 | | | | | |
| Class A1 | | | | | |
| Class A2 | | | | | |
| Class B | 0.12% | −0.03% | 0.26% | 98% | 104% |
| Class C | 0.66% | 0.73% | 0.89% | 96% | 110% |
| Class E | 0.08% | −0.52% | −0.24% | 101% | 109% |
| Overall | 0.29% | 0.10% | 0.34% | 98% | 107% |
| Class D | 1.07% | 1.74% | 1.88% | 93% | 115% |
| Class F (optional) | #VALUE! | #VALUE! | #VALUE! | #DIV/0! | #DIV/0! |

Referring to Table 1, encoding loss of Y 0.46% in the all intra experiment, Y 0.36% in a random access experiment, and Y 0.29% in a low delay B experiment. may be derived. However, by limiting the 4×4-sized luma block and the 2×2-sized chroma block, the worst case data throughput may be halved and the encoding and decoding processing rate may be reduced.

In addition, experimental results for UHD and FHD images (i.e., high-resolution images) in which a 4×4-sized luma block and a 2×2-sized chroma block are limited may be derived as shown in the following table. That is, the experiment may represent coding of UHD and FHD images (i.e., high-resolution images) in which a minimum size of the luma block is 4×8 size/8×4 size and a minimum size of the chroma block is 2×4 size/4×2 size.

TABLE

| | Y | U | V | EncT | DecT |
|---|---|---|---|---|---|
| Over VTM-2.0.1 | | | | | |
| All Intra Main10 | | | | | |
| Class A1 | 0.10% | 0.01% | −0.07% | 92% | 97% |
| Class A2 | 0.12% | 0.04% | −0.01% | 90% | 97% |
| Class B | 0.30% | 0.15% | 0.17% | 88% | 93% |
| Overall | 0.19% | 0.08% | 0.06% | 89% | 95% |

TABLE-continued

| | Over VTM-2.0.1 | | | | |
|---|---|---|---|---|---|
| | Y | U | V | EncT | DecT |
| | Random Access Main 10 | | | | |
| Class A1 | 0.06% | 0.03% | 0.17% | 98% | 99% |
| Class A2 | 0.15% | 0.02% | 0.04% | 94% | 97% |
| Class B | 0.25% | 0.34% | 0.44% | 95% | 97% |
| Overall | 0.17% | 0.17% | 0.26% | 96% | 98% |
| | Low delay B Main10 | | | | |
| Class B | 0.12% | −0.03% | 0.26% | 98% | 104% |
| Overall | 0.12% | −0.03% | 0.26% | 98% | 104% |

Referring to Table 2 above, Y 0.19% in all intra experiments for UHD and FHD experimental images, Y 0.17% in random access experiments, and Y 0.12% low delay B experiments may be derived. Accordingly, it can been seen that the method of limiting the minimum block size is more effective in coding for a high-resolution image, which is an encoding target of the VVC standard.

Based on the experimental results described above, the present embodiment proposes a method of adaptively adjusting a minimum block size as follows.

If the size (i.e., resolution) of the input image is greater than or equal to FHD, the luma block is prohibited from being partitioned into 4×4-sized luma blocks, and the chroma block is prohibited from being partitioned into 2×2-sized chroma blocks.

Specifically, when the size (i.e., resolution) of the input image is greater than or equal to FHD, the following conditions may be applied when determining whether to partition the block QT/BT/TT.

When the size (i.e., resolution) of the input image is FHD or higher, the QT/BT/TT partitioning condition is determined.

1) In the case of 4×4 blocks after QT, horizontal BT, vertical BT, horizontal TT or vertical TT partitioning in the current luma block, the corresponding partitioning is prohibited.

2) In the case of 2×2 blocks after QT, horizontal BT, vertical BT, horizontal TT or vertical TT partitioning in the current chroma block, the corresponding partitioning is prohibited.

Meanwhile, the QT structure, the BT structure, and the TT structure may be described later.

Figure 4:
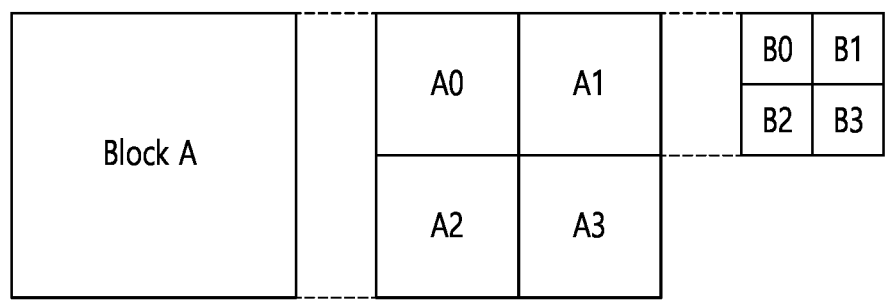
FIG. 4 shows an example of partitioning a block through a QT structure.

FIG. 4 shows an example of partitioning a block through the QT structure. The QT structure may represent a structure in which a block having a size of 2N×2N is partitioned into four sub-blocks having a size of N×N. Referring to FIG. 4, block A may be partitioned into four square sub-blocks (block A0, block A1, block A2, and block A3) according to the QT structure. In addition, the partitioned block may be partitioned into blocks of a lower depth recursively by the QT structure. For example, referring to FIG. 4, the sub-block A1 may be partitioned into four sub-blocks (block B0, block B1, block B2, and block B3) according to the QT structure.

Figure 5:
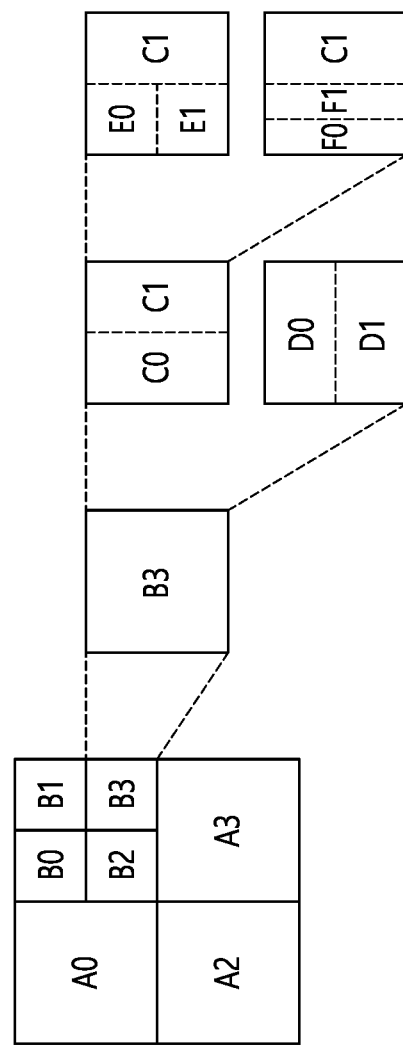
FIG. 5 shows an example of partitioning a block through a BT structure.

FIG. 5 shows an example of partitioning a block through the BT structure. The BT structure may represent a structure in which a W×H-sized block is partitioned into two (W/2)×H-sized sub-blocks or two W×(H/2)-sized sub-blocks. The structure in which the W×H-sized block is partitioned into two (W/2)×H-sized sub-blocks may be expressed as a vertical BT structure, and the structure in which the W×H-sized block is partitioned into two W×(H/2)-sized sub-blocks may be referred to as a horizontal BT structure.

Referring to FIG. 5, a block B3 that is no longer partitioned by a QT structure may be partitioned into a sub-block C0 and a sub-block C1 by a vertical BT structure, or may be partitioned into a sub-block D0 and a sub-block D1 by a horizontal BT structure. In addition, like block C0, each sub-block may be further partitioned into a horizontal BT structure (e.g., sub-block E0, sub-block E1) or a vertical BT structure (e.g., sub-block F0, sub-block F1) recursively.

Figure 6:
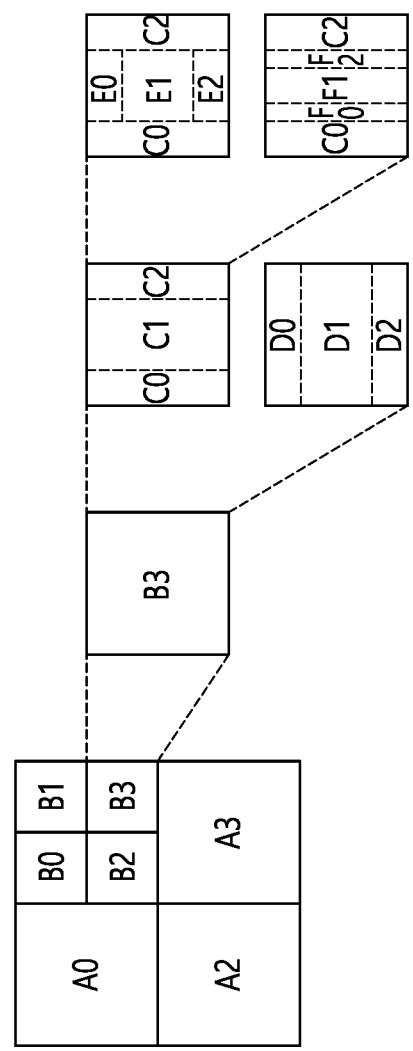
FIG. 6 shows an example of partitioning a block through a TT structure.

FIG. 6 shows an example of partitioning a block through the TT structure. The TT structure may represent a structure in which a W×H-sized block is partitioned into two (W/4)×H-sized sub-blocks and (W/2)×H-sized sub-blocks, or two W×(H/4)-sized sub-blocks and W×(H/2)-sized sub-blocks. In this case, among the three sub-blocks, a (W/2)×H-sized sub-block or W×(H/2)-sized sub-block may be a central sub-block. The structure in which the W×H-sized block is partitioned into two (W/4)×H-sized sub-blocks and (W/2)×H-sized sub-blocks may be represented as a vertical TT structure, and the structure in which the W×H-sized block is partitioned into two W×(H/4)-sized sub-blocks and W×(H/2)-sized sub-blocks may be represented as a horizontal TT structure.

Referring to FIG. 6, a block B3 that is no longer partitioned by a QT structure may be partitioned into a sub-block C0, a sub-block C1, and a sub-block C2 by a vertical TT structure, or partitioned into D0, sub-block D1, and sub-block D2 by a horizontal TT structure. In addition, like block C1, each sub-block may be further partitioned recursively through a horizontal TT structure (e.g., partitioned into sub-block E0, sub-block E1, sub-block E2) or vertical TT structure (e.g., sub-block F0, sub-block F1, and sub-block F2).

Meanwhile, the current block may be recursively partitioned according to a quad-tree binary-tree ternary-tree (QTBTTT) structure. For example, the current block may be partitioned into a plurality of coding units of a deeper depth based on a quad tree structure, a binary tree structure, and/or a ternary structure. The QTBTTT structure may also be referred to as a multi-type tree (MTT) structure.

For example, the current block may be partitioned according to the MTT structure based on signaled partitioning information.

Figure 7:
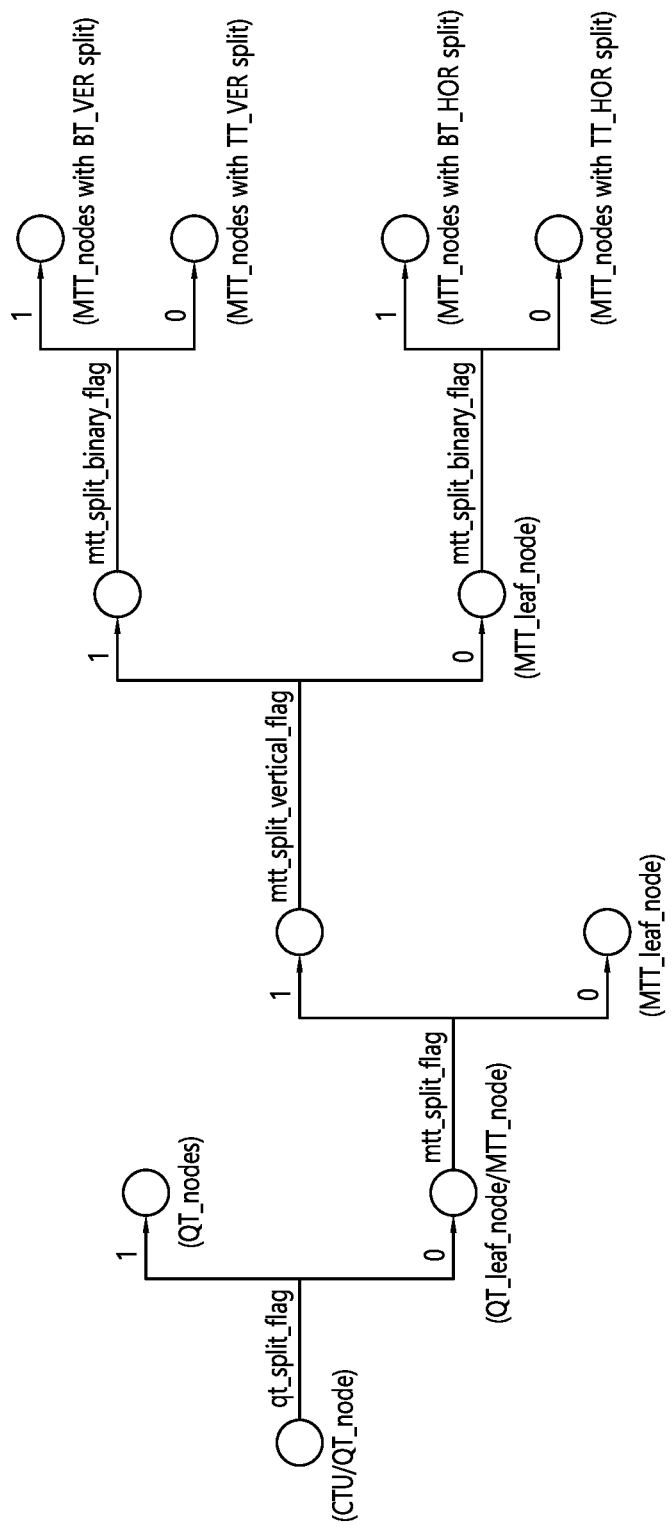
FIG. 7 exemplarily shows a signaling mechanism of partitioning information.

FIG. 7 exemplarily shows a signaling mechanism of partitioning information.

Referring to FIG. 7, a CTU may be treated as a root of a QT, and thus, the CTU may be initially partitioned into the QT structure. Thereafter, each QT leaf node (CU which is no longer partitioned into the QT structure) may be further partitioned into an MTT structure afterwards. In the MTT structure, a first flag (e.g., MTT split CU flag (mtt_split_cu_flag)) may be signaled to indicate whether a corresponding node (i.e., the corresponding CU) is additionally partitioned. When the corresponding node is additionally partitioned (i.e., when the value of the first flag is 1), a second flag (e.g., MTT split CU vertical flag (mtt_split_cu_vertical_flag)) may be signaled to indicate a partitioning direction. That is, the second flag may indicate the partitioning direction of the corresponding node. Thereafter, a third flag (e.g., MTT split CU binary flag (mtt_split_cu_binary_flag)) may be signaled to indicate whether a partition type is binary partitioning or ternary partitioning. That is, the third flag may indicate whether the partition type of the corresponding node is binary partitioning or ternary partitioning. For example, a multi-type tree partitioning mode (MttSplitMode) of a corresponding CU derived based on the second flag and the third flag may be derived as shown in the following.

TABLE 3

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Here, SPLIT_TT_HOR, SPLIT_BT_HOR, SPLIT_TT_VER, and SPLIT_BT_VER may represent a partition type (or a multi-type tree partition mode). Specifically, SPLIT_TT_HOR may represent a horizontal ternary type, SPLIT_BT_HOR may represent a horizontal binary type, SPLIT_TT_VER may represent a vertical ternary type, and SPLIT_TT_VER may represent a vertical binary type. Referring to Table 3, when the value of the second flag is 0 and the value of the third flag is 0, the partition type of the corresponding CU may be derived as the horizontal ternary type, when the value of the second flag is 0 and the value of the third flag is 1, the partition type of the CU may be derived as the horizontal binary type, when the value of the second flag is 1 and the value of the third flag is 0, the partition type of the corresponding CU may be derived as the vertical ternary type, and when the value of the second flag is 1 and the value of the third flag is 1, the partition type of the corresponding CU may be derived as the vertical binary type.

Figure 8:
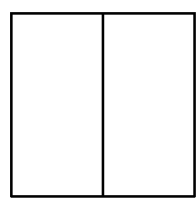
FIG. 8 exemplarily shows a partition type in an MTT structure.
Figure 8:
Figure 8:
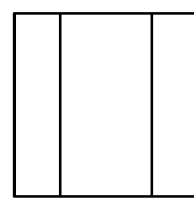
Figure 8:
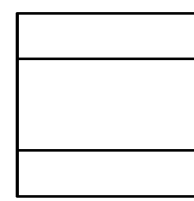

FIG. 8 exemplarily shows a partition type in an MTT structure.

Referring to FIG. 8, the horizontal ternary type may be a type in which a block is partitioned into two W×(H/4)-sized sub-blocks and W×(H/2)-sized sub-blocks, in which the W×(H/2)-sized sub-block of is a central sub-block. In addition, referring to FIG. 8, the vertical ternary may represent a type in which a block is partitioned into two (W/4)×H-sized sub-blocks and (W/2)×H-sized sub-blocks, in which the (W/2)×H-sized sub-block is a central sub-block. Also, referring to FIG. 8, the horizontal binary type may represent a type in which a block is partitioned into two W×(H/2)-sized sub-blocks, and the vertical binary type may represent a type in which a block is partitioned into two (W/2)×H-sized sub-blocks.

Meanwhile, an embodiment in which the above-described condition is applied when determining whether to QT/BT/TT partition a block when a size (i.e., resolution) of the input image is greater than or equal to FHD is as follows.

Figure 9:
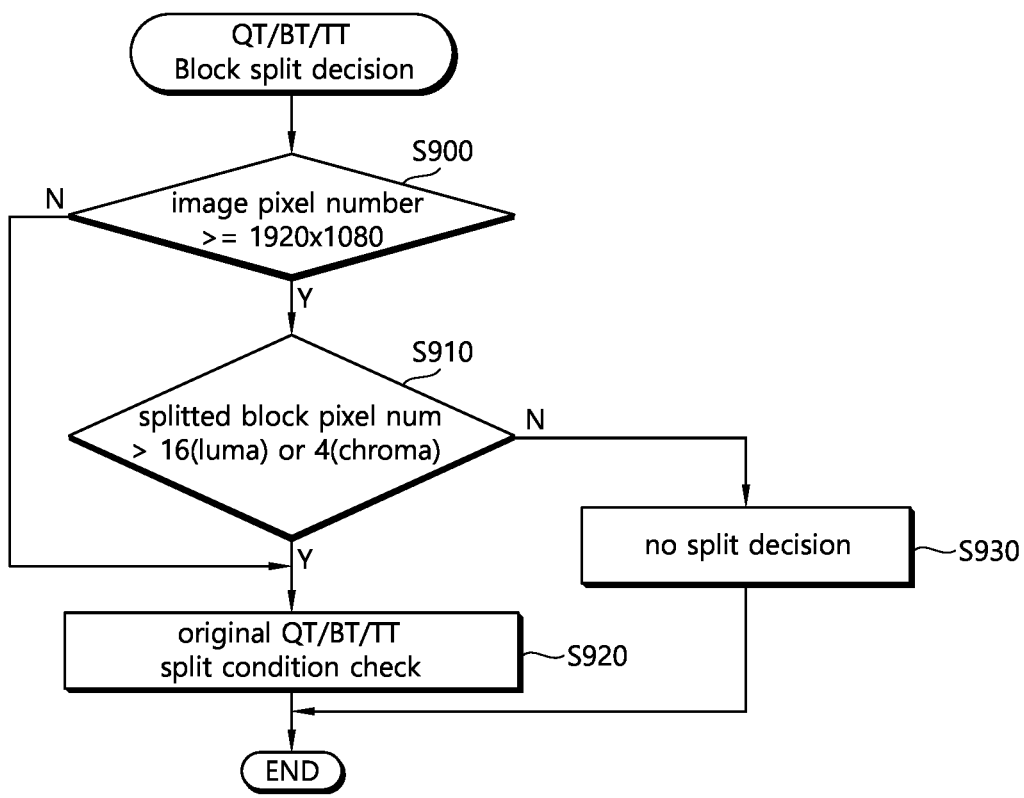
FIG. 9 exemplarily shows an embodiment in which partitioning into a 4×4 size luma block and a 2×2 size chroma block is prohibited when a size of an input image is FHD or larger.

FIG. 9 exemplarily shows an embodiment in which partitioning into a 4×4-sized luma block and a 2×2-sized chroma block is prohibited when the size of an input image is greater than or equal to FHD.

Referring to FIG. 9, the encoding apparatus/decoding apparatus may determine whether the number of samples (or the number of pixels) of the current image is 1920×1080 or higher (S900).

When the number of samples of the current image is 1920×1080 or more, the encoding apparatus/decoding apparatus may determine whether the number of samples of the block generated by partitioning the current block into a QT structure, a BT structure, or a TT structure is greater than a specific number (S910). When the current block is a current luma block, the encoding apparatus/decoding apparatus may determine whether the number of samples of the generated blocks by partitioning is greater than 16, and when the current block is a current chroma block, the encoding apparatus/decoding apparatus may determine whether the number of samples of the generated blocks by partitioning is greater than 4. The specific number may be represented as a threshold value.

When the number of samples of the generated blocks by partitioning is greater than the specific number, the encoding apparatus/decoding apparatus may check the existing QT/BT.TT partitioning condition for the current block and perform partitioning on the current block. (S920).

Alternatively, when the number of samples of the generated blocks by partitioning is not greater than the specific number, the encoding apparatus/decoding apparatus may not perform partitioning on the current block (S930).

Meanwhile, when the number of samples of the current image is less than 1920×1080, the encoding apparatus/decoding apparatus may check the existing QT/BT.TT partitioning condition for the current block without the determination process of step S910, and then perform partitioning on the current block (S920).

Alternatively, more specifically, an embodiment in which a minimum block size is adaptively determined by partitioning an image size (i.e., resolution) may be proposed. The above embodiment is as follows.

When a size of an input image is FHD or higher and UHD or smaller, partitioning into 4×4-sized luma blocks and 2×2-sized chroma blocks is prohibited.

When a size of the input image is UHD or larger, partitioning into 4×4 size, 4×8 size, 8×4-sized luma blocks and 2×2 size, 4×2 size, and 2×4-sized chroma block is prohibited.

Specifically, when the size (i.e., resolution) of the input image corresponds to the above-described condition, the following conditions may be applied when determining whether to QT/BT/TT partition a block.

QT/BT/TT partitioning condition determination when a size of the input image is greater than FHD and less than UHD 1) If the current luma block becomes a 4×4-sized block after QT, horizontal BT, vertical BT, horizontal TT, or vertical TT partitioning, the corresponding partitioning is prohibited.

2) If the current chroma block becomes a 2×2-sized block after QT, horizontal BT, vertical BT, horizontal TT or vertical TT partitioning, the corresponding partitioning is prohibited.

QT/BT/TT partitioning condition determination when a size of the input image is UHD or greater 1) If the current luma block becomes a 4×4-sized, 4×8-sized or 8×4-sized block after QT, horizontal BT, vertical BT, horizontal TT or vertical TT partitioning, the corresponding partitioning is prohibited.

2) If the current chroma block becomes a 2×2-sized, 2×4-sized, or 4×2-sized after QT, horizontal BT, vertical BT, horizontal TT or vertical TT partitioning, the corresponding partitioning is prohibited.

According to the present embodiment, by applying different minimum block sizes in FHD and UHD as described above, it is possible to reduce the throughput of worst case data during encoding/decoding of UHD video to ¼ and at the same time minimize encoding loss.

Meanwhile, when the size (i.e., resolution) of the input image is greater than or equal to FHD, an embodiment in which the above-described condition is applied when determining whether to QT/BT/TT partition a block is as follows.

Figure 10:
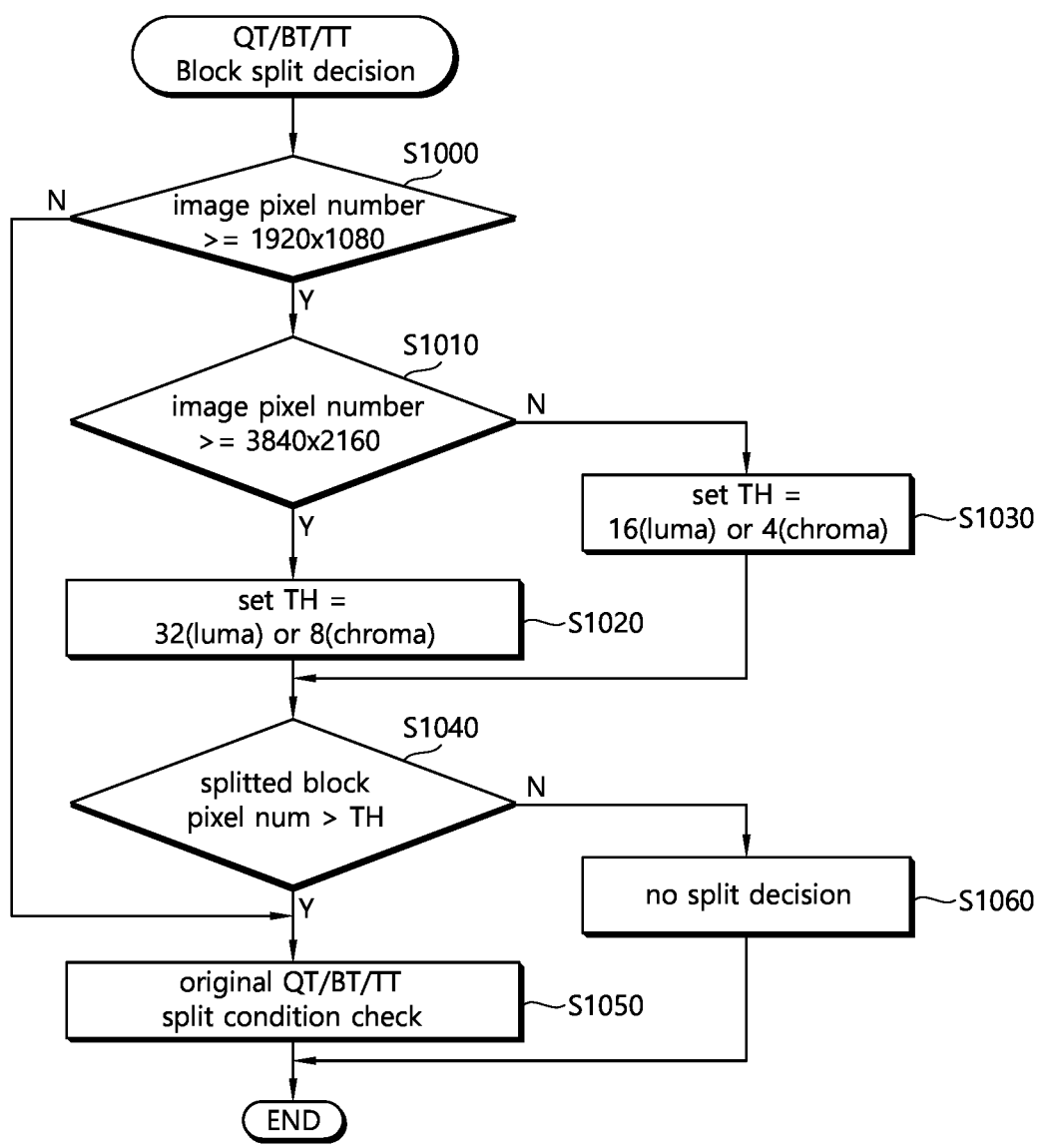
FIG. 10 exemplarily shows an embodiment in which a minimum block size is adjusted based on a size of an input image.

FIG. 10 exemplarily shows an embodiment in which a minimum block size is adjusted based on a size of an input image.

Referring to FIG. 10, the encoding apparatus/decoding apparatus may determine whether the number of samples (or the number of pixels) of the current image is 1920×1080 or higher (S1000).

When the number of samples of the current image is 1920×1080 or greater, the encoding apparatus/decoding apparatus may determine whether the number of samples (or the number of pixels) of the current image is 3840×2160 or greater (S1010).

When the number of samples of the current image is 3840×2160 or more, the encoding apparatus/decoding apparatus may set a threshold value for the current block (S1020). In this case, the threshold value for the current luma block may be set to 32, and the threshold value for the current chroma block may be set to 8. Alternatively, when the number of samples of the current image is less than 3840×2160, the encoding apparatus/decoding apparatus may set a threshold value for the current block (S1030). In this case, a threshold value for the current luma block may be set to 16 and a threshold value for the current chroma block may be set to 4.

Thereafter, the encoding apparatus/decoding apparatus may determine whether the number of samples of the blocks generated by partitioning the current block into a QT structure, a BT structure, or a TT structure is greater than the set threshold value (S1040).

When the number of samples generated by partitioning the block is greater than the threshold value, the encoding apparatus/decoding apparatus may check the existing QT/BT.TT partitioning condition for the current block and perform the partitioning on the current block (S1050).

Alternatively, when the number of samples generated by partitioning the block is not greater than the threshold value, the encoding apparatus/decoding apparatus may not partition partitioning on the current block (S1060).

Meanwhile, when the number of samples of the current image is less than 1920×1080, the encoding apparatus/decoding apparatus may check the existing QT/BT.TT partitioning condition for the current block without the determination process of steps S1010 to S1040, and perform partitioning on the current block (S1050).

Alternatively, an embodiment in which a minimum block size is determined regardless of size of an input image may be proposed.

As an embodiment, the following scheme may be proposed.

Partitioning into 4×4-sized luma blocks and 2×2-sized chroma blocks is prohibited in all-sized input images Specifically, the following conditions may be applied when determining whether a block is partitioned into QT/BT/TT.

Determine QT/BT/TT partitioning condition in all image sizes

1) If the current luma block becomes a 4×4-sized block after QT, horizontal BT, vertical BT, horizontal TT, or vertical TT partitioning, the partitioning is prohibited.

2) If the current chroma block becomes a 2×2-sized block after QT, horizontal BT, vertical BT, horizontal TT or vertical TT partitioning, the partitioning is prohibited.

Figure 11:
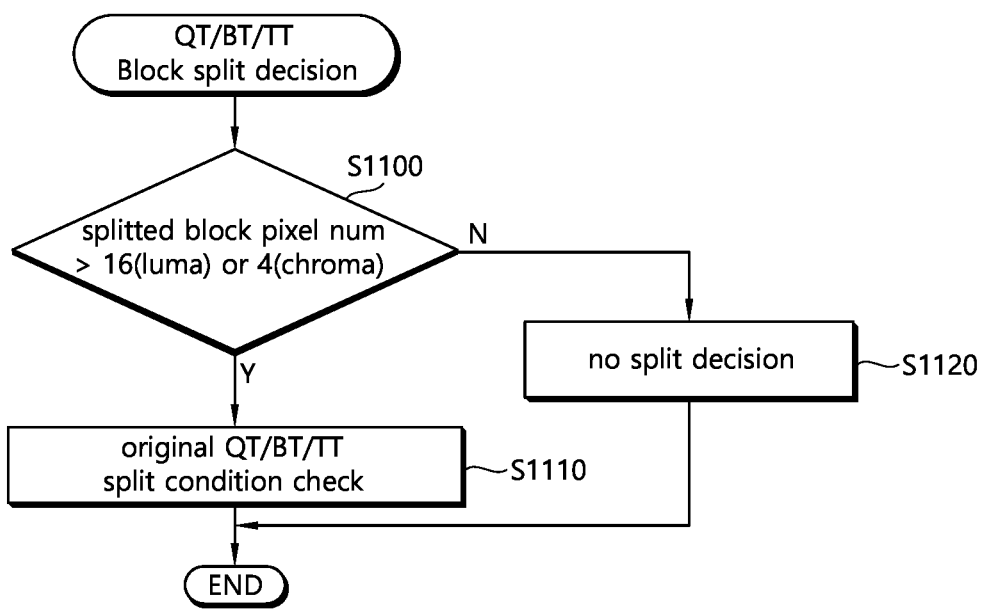
FIG. 11 exemplarily shows an embodiment of adjusting a minimum block size.

FIG. 11 exemplarily shows an embodiment of adjusting the minimum block size.

Referring to FIG. 11, the encoding apparatus/decoding apparatus may determine whether the number of samples of a block generated by partitioning a current block into a QT structure, a BT structure, or a TT structure is greater than a threshold value (S1100). When the current block is a current luma block, the encoding apparatus/decoding apparatus may determine whether the number of divided and generated samples of the block is greater than 16, and when the current block is a current chroma block, the encoding apparatus/decoding apparatus may determine whether the number of partitioned and generated samples of the block is greater than 4. That is, the threshold value for the current luma block may be set to 16, and the threshold value for the current chroma block may be set to 4. In other words, when the current block is a current luma block, the encoding apparatus/decoding apparatus may determine whether the number of samples of the current block is 32 or less, and when the current block is a current chroma block, the encoding apparatus/decoding apparatus may determine whether the number of samples in the current block is 8 or less. That is, the threshold value for the current luma block may be set to 32, and the threshold value for the current chroma block may be set to 8. When the current block is partitioned, when it is partitioned according to the BT structure, it is partitioned into sub-blocks including half the number of samples of the current block, and thus, a value of double of the threshold value of the number of the partitioned and generated samples of the block may be compared with the current block and determined. In addition, when the current block is partitioned, when the current block is partitioned according to the QT structure or the TT structure, it is partitioned into sub-blocks including a sample number of ¼ of the number of samples of the current block, and thus, a value that is four times the threshold of the number of partitioned and generated samples of the block may be compared with the current block and determined.

When the number of partitioned and generated samples of the block is greater than the threshold value (i.e., the number of samples of the current block is less than or equal to the threshold value), the encoding apparatus/decoding apparatus may check the existing QT/BT.TT partitioning conditions for the current block and perform partitioning on the current block (S1110).

Alternatively, when the number of partitioned and generated samples of the block is not greater than the threshold value (that is, when the number of samples of the current block is greater than the threshold value), the encoding apparatus/decoding apparatus may not perform partitioning on the current block (S1120).

Alternatively, the following scheme may be proposed as an embodiment.

Partitioning into 2×2-sized chroma blocks in input image of all sizes

Specifically, when determining whether to QT/BT/TT partition a block, the following conditions may be applied.

Determine QT/BT/TT partitioning condition in all image sizes

1) When the current chroma block becomes a 2×2-sized block after QT, horizontal BT, vertical BT, horizontal TT, or vertical TT partitioning, the corresponding partitioning is prohibited.

For example, the encoding apparatus/decoding apparatus may determine whether the number of samples of a block generated by partitioning the current chroma block into a QT structure, a BT structure, or a TT structure is greater than a threshold value (e.g., 4). For example, the threshold value for the current chroma block may be set to 4.

When the number of the partitioned and generated samples of the block is greater than the threshold value, the encoding apparatus/decoding apparatus may check the existing QT/BT.TT partitioning condition for the current chroma block and perform partitioning on the current chroma block. Alternatively, when the number of partitioned and generated samples of the block is not greater than the threshold value, the encoding apparatus/decoding apparatus may not partition partitioning on the current chroma block.

As in the above-described embodiments, by limiting the minimum block size in all input image sizes, encoding and decoding dependent on the input image may be prevented.

Alternatively, another embodiment may be proposed in which the problem of complexity and high cost in hardware implementation may be solved by adjusting the minimum block size. That is, another embodiment may be proposed in which the data throughput in the worst case is adjusted by adaptively adjusting the minimum block size.

Based on the experimental results shown in Table 2 above, the present embodiment proposes a method of transmitting minimum block size information by a high level syntax (HLS) such as a sequence parameter set (SPS), a picture parameter set (PPS), or a slice header. That is, according to the present embodiment, the minimum block size information indicating the minimum block size may be signaled by the SPS, PPS, or slice header, and block partitioning may be performed based on the minimum block size derived based on the minimum block size information.

For example, the minimum block size information in the SPS may be represented as shown in the table below. That is, the minimum block size information signaled by the SPS may be as shown in the following table.

TABLE 4

|  | Descriptor |
|---|---|
| seq_parameter_set_rbsp( ) { |  |
| sps_seq_parameter_set_id | ue(v) |
| chroma_format_idc | ue(v) |
| if( chroma_format_idc = = 3 ) |  |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| log2_min_qt_size_intra_slices_minus2 | ue(v) |
| log2_min_qt_size_inter_slices_minus2 | ue(v) |
| log2_min_cu_pixel_num_luma_minus4 | ue(v) |
| log2_min_cu_pixel_num_chroma_minus2 | ue(v) |
| max_mtt_hierarchy_depth_inter_slices | ue(v) |
| max_mtt_hierarchy_depth_intra_slices | ue(v) |
| sps_cclm_enabled_flag | ue(1) |
| sps_mts_intra_enabled_flag | ue(1) |
| sps_mts_inter_enabled_flag | ue(1) |
| rbsp_trailing_bits( ) |  |
| } |  |

The minimum block size information may include minimum luma block size information and/or minimum chroma block size information. The minimum luma block size information may represent a minimum luma block size, and the minimum chroma block size information may represent a minimum chroma block size. Referring to Table 4, log2_min_cu_pixel_num_luma_minus4 and log2_min_cu_pixel_num_chroma_minus2 may be included in the SPS. The log2_min_cu_pixel_num_luma_minus4 may indicate a syntax element of the minimum luma block size information, and the log2_min_cu_pixel_num_chroma_minus2 may indicate a syntax element of the minimum chroma block size information.

The decoding apparatus may limit the minimum block size based on the log2_min_cu_pixel_num_luma_minus4 and the log2_min_cu_pixel_num_chroma_minus2.

As an example, when a value of the signaled log2_min_cu_pixel_num_luma_minus4 is 0 and a value of log2_min_cu_pixel_num_chroma_minus2 is 0, a minimum number of samples of the luma block represented by log2_min_cu_pixel_num_luma_minus4 is 16 (for example, log2_num_num_2×4 size) The minimum number of samples of the indicated chroma block may be 4 (e.g., 2×2 size). Therefore, the minimum block size limitation may not be performed.

As another example, when the value of the signaled log2_min_cu_pixel_num_luma_minus4 is 1 and the value of log2_min_cu_pixel_num_chroma_minus2 is 1, the minimum number of samples of the luma block represented by log2_min_cu_pixel_num_luma_minus4 may be 32 and the minimum number of chroma blocks represented by log2_min_pixel_num_2 samples may be 8. Accordingly, the decoding apparatus may limit the size of a 4×4-sized luma block and a 2×2-sized chroma block. That is, the decoding apparatus may limit partitioning into a 4×4-sized luma block and a 2×2-sized chroma block.

As another example, when the value of the signaled log2_min_cu_pixel_num_luma_minus4 is 0 and the value of log2_min_cu_pixel_num_chroma_minus2 is 2, the minimum number of samples of luma blocks represented by log2_min_cu_pixel_num_luma_minus4 may be 16 and the minimum number of chroma blocks represented by the log2_pixel_num_num_2 samples may be 16. In this case, the decoding apparatus may not limit the minimum luma block size. In addition, the decoding apparatus may limit chroma block sizes of 2×2, 2×4, and 4×2 sizes. That is, the decoding apparatus may limit partitioning into 2×2, 2×4, and 4×2-sized chroma blocks.

Figure 12:
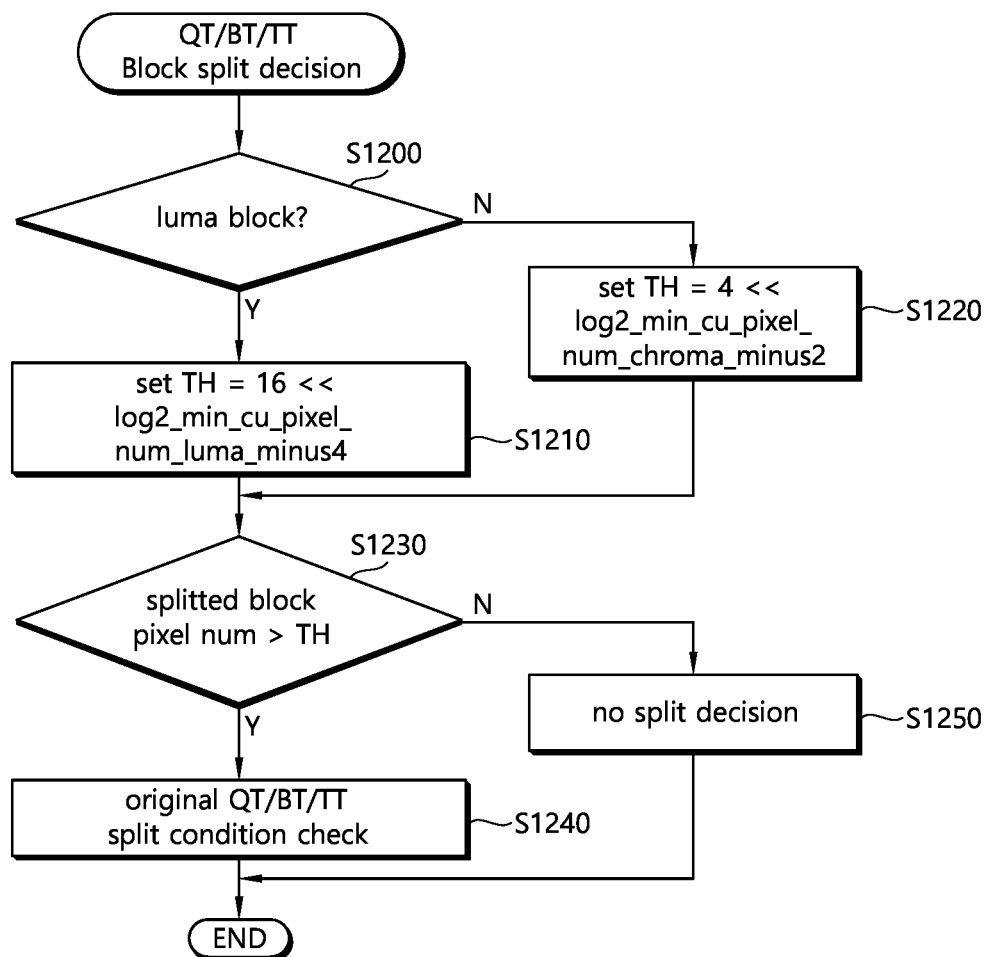
FIG. 12 exemplarily shows an embodiment of determining a minimum block size based on signaled minimum block size information.

FIG. 12 exemplarily shows an embodiment of determining a minimum block size based on signaled minimum block size information.

Referring to FIG. 12, the encoding apparatus/decoding apparatus may determine whether the current block is a luma block (S1200). That is, the encoding apparatus/decoding apparatus may determine whether the current block is a current luma block or a current chroma block.

When the current block is the current luma block, the encoding apparatus/decoding apparatus may set a threshold value for the current luma block based on log2_min_cu_pixel_num_luma_minus4 (S1210). For example, the threshold value for the current luma block may be set to 16<<log2_min_cu_pixel_num_luma_minus4. Alternatively, when the current block is not the current luma block but is the current chroma block, the encoding apparatus/decoding apparatus may set a threshold value for the current chroma block based on the log2_min_cu_pixel_num_chroma_minus2 (S1220). For example, the threshold value for the current chroma block may be set to 4<<log2_min_cu_pixel_num_chroma_minus2.

Thereafter, the encoding apparatus/decoding apparatus may determine whether the number of samples of the block generated by partitioning the current block into a QT structure, a BT structure, or a TT structure is greater than the set threshold value (S1230).

When the number of generated samples by partitioning the block is greater than the threshold value, the encoding apparatus/decoding apparatus may check the existing QT/BT.TT partitioning condition for the current block and perform partitioning on the current block (S1240).

Alternatively, when the number of generated samples by partitioning the block is not greater than the threshold value, the encoding apparatus/decoding apparatus may not perform partitioning on the current block (S1250).

Meanwhile, the encoding apparatus may perform encoding by setting the values of log2_min_cu_pixel_num_luma_minus4 and log2_min_cu_pixel_num_chroma_minus2 and transmit the information through SPS. In addition, the encoding apparatus may perform encoding after performing the minimum block size limitation based on the set log2_min_cu_pixel_num_luma_minus4 and log2_min_cu_pixel_num_chroma_minus2.

In addition, the values of log2_min_cu_pixel_num_luma_minus4 and log2_min_cu_pixel_num_chroma_minus2 may be set according to the image size as in the previous embodiment, or the value may be directly set at the time of encoding and encoding may be performed.

Figure 13:
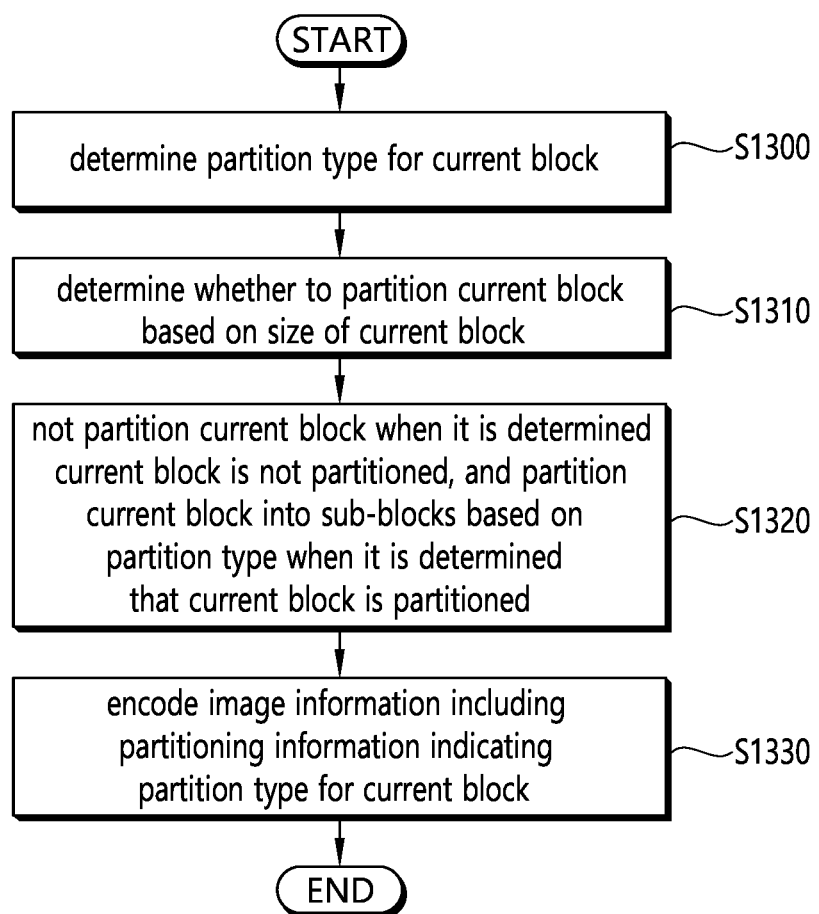
FIG. 13 schematically shows an image encoding method by an encoding apparatus according to the present disclosure.

FIG. 13 schematically shows a video encoding method by an encoding apparatus according to the present disclosure. The method disclosed in FIG. 13 may be performed by the encoding apparatus disclosed in FIG. 2. Specifically, for example, steps S1300 to S1320 of FIG. 13 may be performed by the image partitioner of the encoding apparatus, and S1330 may be performed by the entropy encoder of the encoding apparatus. In addition, although not shown, a process of deriving a residual sample for the current block (or a sub-block of the current block) based on the original sample and a predicted sample for the current block (or a sub-block of the current block) may be performed by the subtractor of the encoding apparatus, a process of deriving reconstructed samples for the current block (or sub-block of the current block) based on the residual samples for the current block (or sub-block of the current block) and prediction samples may be performed by the adder of the encoding apparatus, and a process of generating information on residual for the current block (or a sub-block of the current block) based on the residual sample may be performed by the transformer of the encoding apparatus, and a process of encoding the information on the residual may be performed by the entropy encoder of the encoding apparatus.

The encoding apparatus determines a partition type for the current block (S1300). The encoding apparatus may partition an input image (or picture, frame) into one or more processing units. For example, the current block may be recursively partitioned according to a QTBTTT (quad-tree binary-tree ternary-tree) structure from a coding tree unit (CTU) or a largest coding unit (LCU). For example, the current block may be partitioned into a plurality of sub-blocks based on a QT (Qaud-Tree) type, a horizontal binary type, a horizontal ternary type, a vertical binary type, and/or a vertical ternary type. The encoding apparatus may determine the partition type for the current block as one of the QT (Qaud-Tree) type, the horizontal binary type, the horizontal ternary type, the vertical binary type, and the vertical ternary type.

The encoding apparatus determines whether to partition the current block based on a size of the current block (S1310). The encoding apparatus may determine whether to partition the current block based on the size of the current block. The size of the current block may represent the number of samples of the current block. Alternatively, the size of the current block may represent a width or height of the current block. For example, when the partition type of the current block is a vertical binary type or a vertical ternary type, the size of the current block may be a width of the current block, and when the partition type of the current block is a horizontal binary type or a horizontal ternary type, the size of the current block may be a height of the current block.

For example, when the current block is a chroma block and a size of the current block is less than or equal to the minimum chroma block size, it may be determined that the current block is not partitioned. In addition, when the current block is a chroma block and a size of the current block is larger than the minimum chroma block size, it may be determined that the current block is partitioned.

For example, when the current block is the chroma block and the size of a sub-block partitioned and derived from the current block is 2×2, it may be determined that the current block is not partitioned.

Further, for example, when the current block is a luma block and the size of the current block is less than or equal to the minimum luma block size, it may be determined that the current block is not partitioned. In addition, when the current block is a luma block and a size of the current block is larger than the minimum luma block size, it may be determined that the current block is partitioned.

For example, when the current block is the luma block and a size of the sub-block partitioned and derived from the current block is 4×4, it may be determined that the current block is not partitioned.

Meanwhile, the minimum chroma block size may be derived as follows.

As an example, the minimum chroma block size may be derived as a preset value. For example, the minimum chroma block size may be 8, 16 or 32.

Alternatively, as an example, the minimum chroma block size may be derived based on information indicating the minimum chroma block size. For example, the encoding apparatus may determine the minimum chroma block size, and generate and encode information indicating the minimum chroma block size, and the minimum chroma block size may be derived based on information indicating the minimum chroma block size. The minimum chroma block size may be derived as 8, 16, or 32 based on information indicating the minimum chroma block size.

In addition, the minimum luma block size may be derived as follows.

As an example, the minimum luma block size may be derived as a preset value. For example, the minimum luma block size may be 16, 32, or 64.

Alternatively, as an example, the minimum luma block size may be derived based on information indicating the minimum luma block size. For example, the encoding apparatus may determine the minimum luma block size, and generate and encode information indicating the minimum luma block size, and the minimum luma block size may be derived based on the information indicating the minimum chroma block size. For example, the minimum luma block size may be derived as 16, 32, or 64 based on the information indicating the minimum luma block size.

When it is determined that the current block is not partitioned, the encoding apparatus does not partition the current block, and when it is determined that the current block is partitioned, the encoding apparatus partitions the current block into sub-blocks based on the partition type (S1320).

For example, when it is determined that the current block is partitioned, the encoding apparatus may partition the current block into the sub-blocks according to the partition type. The partition type may be one of the QT (Qaud-Tree) type, the horizontal binary type, the horizontal ternary type, the vertical binary type, and the vertical ternary type.

The QT type may indicate a type in which a block is partitioned into four (W/2)×(H/2)-sized sub-blocks. Here, W may denote a width of the current block, and H may be a height of the current block. In addition, the horizontal ternary type may indicate a type in which a block is partitioned into two W×(H/4)-sized sub-blocks and W×(H/2)-sized sub-blocks in which the W×(H/2)-sized sub-block is a center sub-block. In addition, the vertical ternary type may indicate a type in which a block is partitioned into two (W/4)×H-sized sub-blocks and (W/2)×H-sized sub-blocks in which the (W/2)×H-sized sub-block is a central sub-block. Block-in type may be indicated. In addition, the horizontal binary type may indicate a type in which a block is partitioned into two W×(H/2)-sized sub-blocks, and the vertical binary type may indicate a type in which a block is partitioned into two (W/2)×H-sized sub-blocks.

Meanwhile, the encoding apparatus may encode the sub-blocks.

For example, as described above, the encoding apparatus may perform prediction on sub-blocks, generate predicted blocks including prediction samples for the sub-blocks, and generate and encode prediction related information for sub-blocks. The image information may include the prediction related information. The encoding apparatus may determine whether intra prediction or inter prediction is applied to each of the sub-blocks, and may determine a specific intra/inter prediction mode for each sub-block. Next, the encoding apparatus may generate prediction samples based on various prediction methods described above.

In addition, for example, although not shown, the encoding apparatus may derive residual samples for the sub-blocks based on the original samples and prediction samples for the sub-blocks, generate Information on the residual for the sub-blocks based on the residual samples, and encode the information on the residual. The image information may include the information on the residual. Also, the encoding apparatus may generate reconstructed samples for the sub-blocks based on the prediction samples and the residual samples for the sub-blocks.

Further, for example, when the current block is not partitioned, the encoding apparatus may decode the current block.

For example, as described above, the encoding apparatus may perform prediction on the current block and generate a predicted block including a prediction sample for the current block, and generate and encode prediction related information on the current block. The image information may include the prediction related information. The encoding apparatus may determine whether intra prediction or inter prediction is applied to the current block, and may determine a specific intra/inter prediction mode for the current block. Next, the encoding apparatus may generate a prediction sample based on various prediction methods described above.

In addition, for example, although not shown, the encoding apparatus may derive a residual sample for the current block based on the original sample and the predicted sample for the current block, generate information on residual for the current block based on the residual sample, and encode the information on the residual. Also, the encoding apparatus may generate a reconstructed sample for the current block based on the prediction sample and the residual sample for the current block.

The encoding apparatus encodes image information including partitioning information indicating a partition type for the current block (S1330). The encoding apparatus may encode image information including partitioning information indicating a partition type for the current block and signal the information through a bitstream.

As an example, the partitioning information may include a first flag indicating whether the current block is partitioned into a QT (Quad-Tree) type or not. Here, the QT type may indicate a partition type in which the current block is partitioned into four (W/2)×(H/2)-sized sub-blocks. W may denote a width of the current block, and H may denote a height of the current block.

In addition, when the value of the first flag is 0, the partitioning information may include a second flag and a third flag. The second flag may indicate a partitioning direction of the current block, and the third flag may indicate whether the partition type of the current block is a binary-tree (BT) type or a tertiary-tree (TT) type. A syntax element indicating the first flag may be split_qt_flag, a syntax element indicating the second flag may be mtt_split_cu_vertical_flag, and a syntax element indicating the third flag may be mtt_split_cu_binary_flag.

In addition, for example, the image information may include information indicating a minimum luma block size. The information indicating the minimum luma block size may be signaled in units of a coding unit (CU), a slice header, a picture parameter set (PPS), or a sequence parameter set (SPS). That is, the information indicating the minimum luma block size may be signaled as a coding unit (CU), a slice header, a picture parameter set (PPS), or a sequence parameter set (SPS). Also, for example, the image information may include information indicating a minimum chroma block size. The information indicating the minimum chroma block size may be signaled in units of a coding unit (CU), a slice header, a picture parameter set (PPS), or a sequence parameter set (SPS). The information indicating the minimum luma block size may be signaled as a coding unit (CU), a slice header, a picture parameter set (PPS), or a sequence parameter set (SPS). A syntax element indicating information indicating the minimum luma block size may be log2_min_cu_pixel_num_luma_minus4, and a syntax element indicating information indicating the minimum chroma block size may be log2_min_cu_pixel_num_chroma_minus2.

Meanwhile, the image information may include prediction related information on the current block or the sub-blocks. The prediction related information may indicate information on inter prediction or intra prediction applied to the current block or the sub-blocks. In addition, the image information may include information on a residual for the current block or the sub-blocks.

Meanwhile, the bitstream may be transmitted to a decoding apparatus through a network or a (digital) storage medium. Here, the network may include a broadcasting network and/or a communication network, and the digital storage medium may include various storage media such as USB, SD, CD, DVD, Blu-ray, HDD, and SSD.

Figure 14:
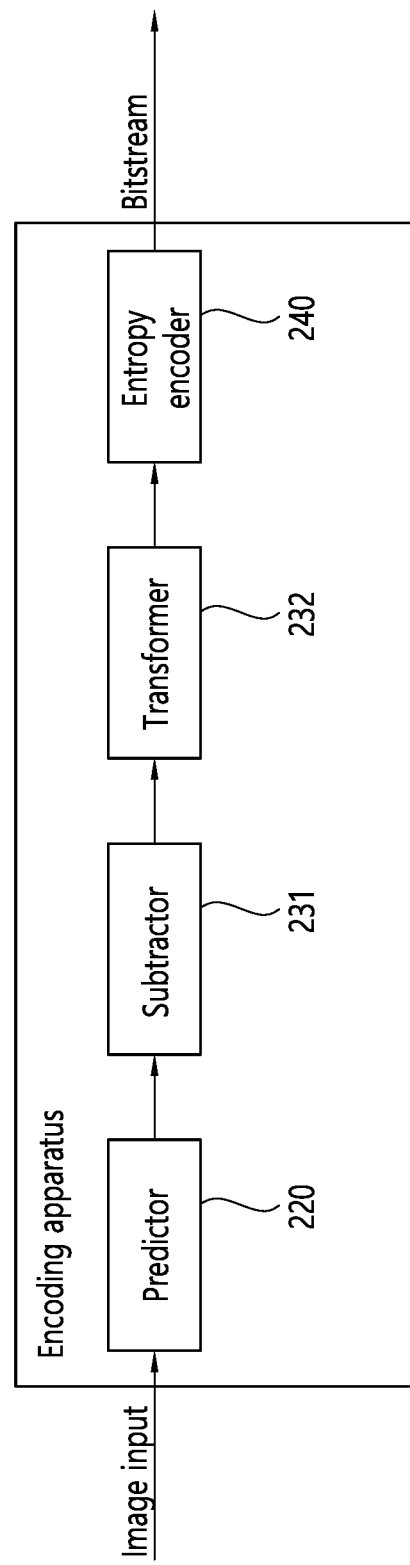
FIG. 14 schematically shows an encoding apparatus that performs an image encoding method according to the present disclosure.

FIG. 14 schematically shows an encoding apparatus that performs an image encoding method according to the present disclosure. The method disclosed in FIG. 13 may be performed by the encoding apparatus disclosed in FIG. 14.

Specifically, for example, the image partitioner of the encoding apparatus of FIG. 14 may perform S1300 to S1320 of FIG. 13, and the entropy encoder of the encoding apparatus of FIG. 14 may perform S1330 of FIG. 13. In addition, although not shown, the process of deriving a residual sample for the current block (or a sub-block of the current block) based on the original sample and the predicted sample for the current block (or a sub-block of the current block) may be performed by the subtractor of the encoding apparatus of FIG. 14, the process of deriving a reconstructed sample for the current block (or a sub-block of the current block) based on a prediction sample and a residual sample for the current block (or a sub-block of the current block) may be performed by the adder of the encoding apparatus of FIG. 14, and the process of generating information on the residual for the current block (or a sub-block of the current block) based on the residual sample may be performed by the transformer of the encoding apparatus of FIG. 14, and the process of encoding the information on the residual may be performed by the entropy encoder of the encoding apparatus of FIG. 14.

Figure 15:
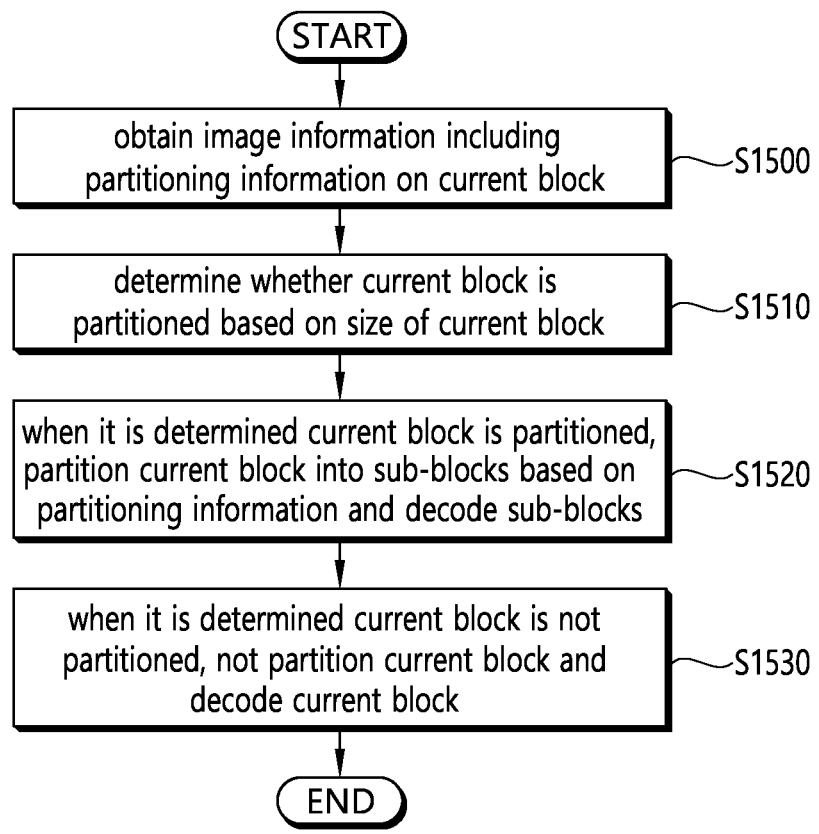
FIG. 15 schematically shows an image decoding method by a decoding apparatus according to the present disclosure.

FIG. 15 schematically shows a video decoding method by the decoding apparatus according to the present disclosure. The method disclosed in FIG. 15 may be performed by the decoding apparatus disclosed in FIG. 3. Specifically, for example, S1500 of FIG. 15 may be performed by the entropy decoder of the decoding apparatus, and steps S1510 and S1520 may be performed by the image partitioner, the predictor, and the adder of the decoding apparatus. In addition, although not shown, the process of acquiring information on the residual of the current block through the bitstream may be performed by the entropy decoder of the decoding apparatus, and the process of deriving the residual sample for the current block based on the residual information may be performed by an inverse transformer of the decoding apparatus.

The decoding apparatus obtains image information including partitioning information (S1500). The decoding apparatus may obtain the image information including the partitioning information through a bitstream.

As an example, the partitioning information may include a first flag indicating whether the current block is partitioned into a QT (Quad-Tree) type or not. Here, the QT type may indicate a partition type in which the current block is partitioned into four (W/2)×(H/2)-sized sub-blocks. W may denote a width of the current block, and H may denote a height of the current block.

In addition, when the value of the first flag is 0, the partitioning information may include a second flag and a third flag. The second flag may indicate a partitioning direction of the current block, and the third flag may indicate whether the partition type of the current block is a binary-tree (BT) type or a tertiary-tree (TT) type. A syntax element indicating the first flag may be split_qt_flag, a syntax element indicating the second flag may be mtt_split_cu_vertical_flag, and a syntax element indicating the third flag may be mtt_split_cu_binary_flag.

In addition, for example, the image information may include information indicating a minimum luma block size. The information indicating the minimum luma block size may be signaled in units of a coding unit (CU), a slice header, a picture parameter set (PPS), or a sequence parameter set (SPS). That is, the information indicating the minimum luma block size may be signaled as a coding unit (CU), a slice header, a picture parameter set (PPS), or a sequence parameter set (SPS). Also, for example, the image information may include information indicating a minimum chroma block size. The information indicating the minimum chroma block size may be signaled in units of a coding unit (CU), a slice header, a picture parameter set (PPS), or a sequence parameter set (SPS). The information indicating the minimum luma block size may be signaled as a coding unit (CU), a slice header, a picture parameter set (PPS), or a sequence parameter set (SPS). A syntax element indicating information indicating the minimum luma block size may be log2_min_cu_pixel_num_luma_minus4, and a syntax element indicating information indicating the minimum chroma block size may be log2_min_cu_pixel_num_chroma_minus2.

Meanwhile, the image information may include prediction related information on the current block or the sub-blocks. The prediction related information may indicate information on inter prediction or intra prediction applied to the current block or the sub-blocks.

The decoding apparatus determines whether to partition the current block based on a size of the current block (S1510). The decoding apparatus may determine whether to partition the current block based on the size of the current block. The size of the current block may represent the number of samples of the current block. Alternatively, the size of the current block may represent a width or height of the current block. For example, when the partition type of the current block is a vertical binary type or a vertical ternary type, the size of the current block may be a width of the current block, and when the partition type of the current block is a horizontal binary type or a horizontal ternary type, the size of the current block may be a height of the current block.

For example, when the current block is a chroma block and a size of the current block is less than or equal to the minimum chroma block size, it may be determined that the current block is not partitioned. In addition, when the current block is a chroma block and a size of the current block is larger than the minimum chroma block size, it may be determined that the current block is partitioned.

For example, when the current block is the chroma block and the size of a sub-block partitioned and derived from the current block is 2×2, it may be determined that the current block is not partitioned.

Further, for example, when the current block is a luma block and the size of the current block is less than or equal to the minimum luma block size, it may be determined that the current block is not partitioned. In addition, when the current block is a luma block and a size of the current block is larger than the minimum luma block size, it may be determined that the current block is partitioned.

For example, when the current block is the luma block and a size of the sub-block partitioned and derived from the current block is 4×4, it may be determined that the current block is not partitioned.

Meanwhile, the minimum chroma block size may be derived as follows.

As an example, the minimum chroma block size may be derived as a preset value. For example, the minimum chroma block size may be 8, 16 or 32.

Alternatively, as an example, the minimum chroma block size may be derived based on the information indicating the minimum chroma block size. For example, the minimum chroma block size may be derived as 8, 16 or 32 based on the information indicating the minimum chroma block size.

In addition, the minimum luma block size may be derived as follows.

As an example, the minimum luma block size may be derived as a preset value. For example, the minimum luma block size may be 16, 32, or 64.

Alternatively, as an example, the minimum luma block size may be derived based on the information indicating the minimum luma block size. For example, the minimum luma block size may be derived as 16, 32, or 64 based on the information indicating the minimum luma block size.

The decoding apparatus decodes the current block or sub-blocks of the current block based on whether to determine the current block as determined (S1520).

For example, when it is determined that the current block is partitioned, the decoding apparatus may partition the current block into sub-blocks based on the partitioning information, and decode the sub-blocks.

For example, when it is determined that the current block is to be partitioned, the decoding apparatus may derive a partition type for the current block based on the partitioning information, and partition the current block into sub-blocks according to the partition type.

For example, the partitioning information may include a first flag. When a value of the first flag is 1, the decoding apparatus may partition the current block into the sub-blocks according to the QT type. The QT type may represent a type in which a block is partitioned into four (W/2)×(H/2)-sized sub-blocks. Here, W may denote a width of the current block and H may be a height of the current block.

Further, for example, when the value of the first flag is 0, the decoding apparatus may partition the current block into sub-blocks through the partition type of the current block derived based on the second flag and the third flag. The partition type derived based on the first flag and the third flag may be one of a horizontal ternary type, a horizontal binary type, a vertical ternary type, and a vertical binary type. For example, when the value of the second flag is 0 and the value of the third flag is 0, the partition type may be derived as the horizontal ternary type. When the value of the second flag is 0 and the value of the third flag is 1, the partition type may be derived as the horizontal binary type. When the value of the second flag is 1 and the value of the third flag is 0, the partition type may be derived as the vertical ternary type, and when the value of the second flag is 1 and the value of the third flag is 1, the partition type may be derived as the vertical binary type.

The horizontal ternary type may be a type in which a block is partitioned into two W×(H/4)-sized sub-blocks and W×(H/2)-sized sub-blocks, in which the W×(H/2)-sized sub-block of is a central sub-block. In addition, the vertical ternary may represent a type in which a block is partitioned into two (W/4)×H-sized sub-blocks and (W/2)×H-sized sub-blocks, in which the (W/2)×H-sized sub-block is a central sub-block. Also, the horizontal binary type may represent a type in which a block is partitioned into two W×(H/2)-sized sub-blocks, and the vertical binary type may represent a type in which a block is partitioned into two (W/2)×H-sized sub-blocks.

Thereafter, the decoding apparatus may decode the sub-blocks.

For example, as described above, the decoding apparatus may perform prediction on the sub-blocks and generate predicted blocks including prediction samples for the sub-blocks. The decoding apparatus may determine whether intra prediction or inter prediction is applied to each of the sub-blocks based on the prediction related information, and may determine a specific intra/inter prediction mode for each sub-block. Next, the decoding apparatus may generate prediction samples based on various prediction methods described above.

The decoding apparatus may generate reconstructed samples based on the prediction samples. For example, the decoding apparatus may receive information on residual for the sub-blocks from the bitstream. The information on the residual may include a transform coefficient on the residual sample. The decoding apparatus may derive the residual samples (or residual sample array) for the sub-blocks based on the information on the residual. In this case, the decoding apparatus may generate the reconstructed samples based on the prediction samples and the residual samples. The decoding apparatus may derive a reconstructed block or a reconstructed picture based on the reconstructed sample. Thereafter, as described above, the decoding apparatus may apply an in-loop filtering procedure such as deblocking filtering and/or SAO procedure to the reconstructed picture in order to improve subjective/objective image quality as needed.

Meanwhile, when it is determined that the current block is not partitioned, the decoding apparatus may decode the current block without partitioning the current block.

For example, as described above, the decoding apparatus may perform prediction on the current block and generate a predicted block including a prediction sample for the current block. The decoding apparatus may determine whether intra prediction or inter prediction is applied to the current block based on the prediction related information and may determine a specific intra/inter prediction mode for the current block. Next, the decoding apparatus may generate a prediction sample based on various prediction methods described above.

The decoding apparatus may generate a reconstructed sample based on the prediction sample. For example, the decoding apparatus may receive information on the residual for the current block from the bitstream. The information on the residual may include a transform coefficient on the residual sample. The decoding apparatus may derive the residual sample (or residual sample array) for the current block based on the information on the residual. In this case, the decoding apparatus may generate the reconstructed sample based on the prediction sample and the residual sample. The decoding apparatus may derive a reconstructed block or a reconstructed picture based on the reconstructed sample. Thereafter, as described above, the decoding apparatus may apply an in-loop filtering procedure such as deblocking filtering and/or SAO procedure to the reconstructed picture in order to improve subjective/objective image quality as needed.

Figure 16:
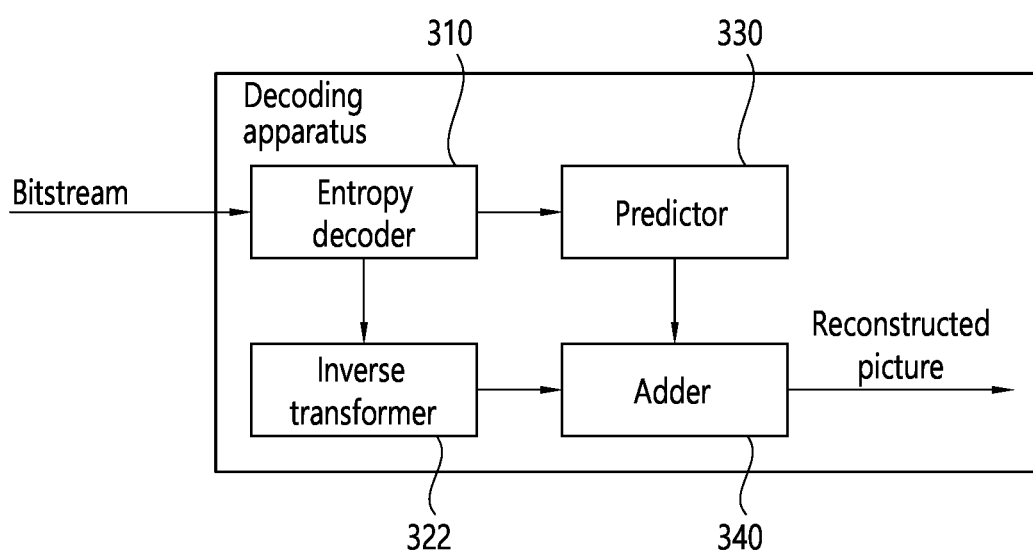
FIG. 16 schematically shows a decoding apparatus for performing an image decoding method according to the present disclosure.

FIG. 16 schematically shows a decoding apparatus for performing a video decoding method according to the present disclosure. The method disclosed in FIG. 15 may be performed by the decoding apparatus disclosed in FIG. 16. Specifically, for example, the entropy decoder of the decoding apparatus of FIG. 16 may perform S1500 of FIG. 15, and the image partitioner, the predictor, and the adder of the decoding apparatus of FIG. 16 may perform steps S1510 and S1520 of FIG. 15. In addition, although not shown, the process of acquiring image information including the information on the residual of the current block through the bitstream may be performed by the entropy decoder of the decoding apparatus of FIG. 16. The process of deriving the residual samples for the current block based on the information on the residual may be performed by the inverse transformer of the decoding apparatus of FIG. 16.

According to the present disclosure, image coding efficiency may be improved by effectively performing image partitioning.

In addition, according to the present disclosure, it is possible to reduce worst case data throughput by limiting partitioning into luma blocks and/or chroma blocks having a specific size or less, thereby efficiently reducing an encoding and decoding processing rate.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 17:
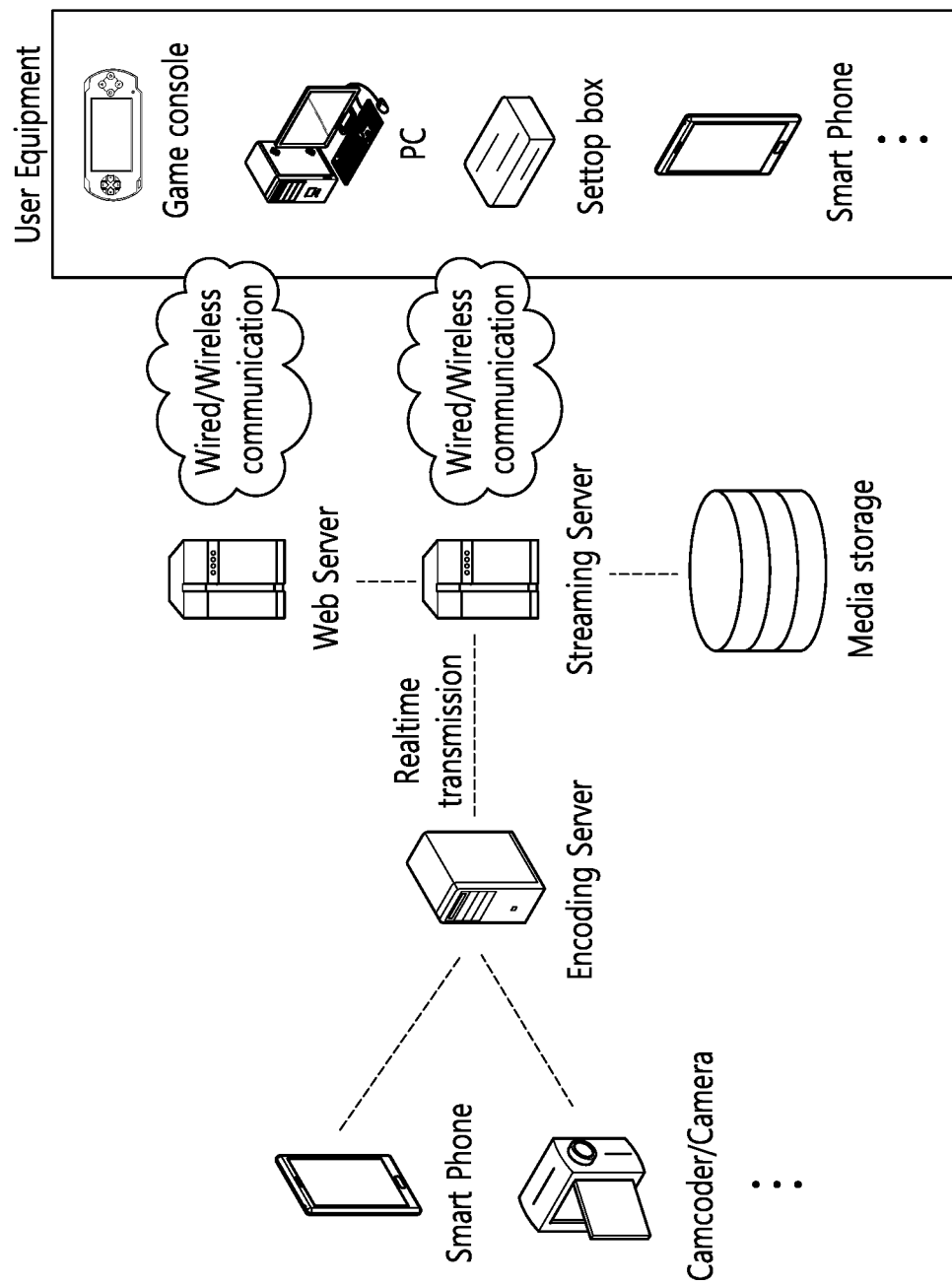
FIG. 17 exemplarily shows a structure diagram of a content streaming system to which embodiments of the present disclosure are applied.

FIG. 17 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

What is claimed is:

1. A video decoding method performed by a decoding apparatus, comprising:
   obtaining image information including partitioning information;
   determining whether a current block is partitioned based on a number of samples of the current block; and
   decoding the current block based on whether the determined current block is partitioned,
   wherein the partitioning information includes a first flag indicating whether the current block is partitioned as quad-tree (QT) type, and
   based on a value of the first flag being 0, the partitioning information includes a second flag and a third flag, the second flag indicates a partitioning direction of the current block, and the third flag indicates whether a partition type of the current block is a binary-tree (BT) type or ternary-tree (TT) type.

2. The video decoding method of claim 1, wherein when the current block is a chroma block and a size of a sub-block partitioned and derived from the current block is 2×2, it is determined that the current block is not partitioned.

3. The video decoding method of claim 1, wherein a minimum chroma block size is 16.

4. The video decoding method of claim 3, wherein the image information includes information indicating the minimum chroma block size, and the minimum chroma block size is derived based on information indicating the minimum chroma block size.

5. The video decoding method of claim 1, wherein when the current block is a luma block and the number of the samples of the current block is equal to or smaller than a minimum luma block size, it is determined that the current block is not partitioned.

6. The video decoding method of claim 5, wherein the image information includes information indicating the minimum luma block size, and the minimum luma block size is derived based on information indicating the minimum luma block size.

7. The video decoding method of claim 6, wherein the information indicating the minimum luma block size is signaled as a sequence parameter set (SPS).

8. The video decoding method of claim 1, wherein the current block is partitioned into sub-blocks based on the partition type of the current block derived based on the second flag and the third flag.

9. The video decoding method of claim 8, wherein
when the value of the second flag is 0 and the value of the third flag is 0, the partition type is derived as a horizontal ternary type,
when the value of the second flag is 0 and the value of the third flag is 1, the partition type is derived as a horizontal binary type,
when the value of the second flag is 1 and the value of the third flag is 0, the partition type is derived as a vertical ternary type, and
when the value of the second flag is 1 and the value of the third flag is 1, the partition type is derived as a vertical binary type.

10. A video encoding method performed by an encoding apparatus, the video encoding method comprising:
determining a partition type for a current block;
determining whether the current block is partitioned based on a number of samples of the current block;
partitioning the current block into sub-blocks based on the partition type based on determination that the current block is partitioned; and
encoding image information including partitioning information indicating the partition type for the current block,
wherein the partitioning information includes a first flag indicating whether the current block is partitioned as quad-tree (QT) type, and
based on a value of the first flag being 0, the partitioning information includes a second flag and a third flag, the second flag indicates a partitioning direction of the current block, and the third flag indicates whether a partition type of the current block is a binary-tree (BT) type or ternary-tree (TT) type.

11. The video encoding method of claim 10, wherein, when the current block is a chroma block and a size of a sub-block partitioned and derived from the current block is 2×2, it is determined that the current block is not partitioned.

12. The video encoding method of claim 10, wherein a minimum chroma block size is 16.

13. A non-transitory computer-readable storage medium storing a bitstream generated by a method, the method comprising:
determining a partition type for a current block;
determining whether the current block is partitioned based on a number of samples of the current block;
partitioning the current block into sub-blocks based on the partition type based on determination that the current block is partitioned; and
encoding image information including partitioning information indicating the partition type for the current block; and
generating the bitstream including the image information,
wherein the partitioning information includes a first flag indicating whether the current block is partitioned as quad-tree (QT) type, and
based on a value of the first flag being 0, the partitioning information includes a second flag and a third flag, the second flag indicates a partitioning direction of the current block, and the third flag indicates whether a partition type of the current block is a binary-tree (BT) type or ternary-tree (TT) type.

* * * * *